US006926989B2

(12) United States Patent
Xie et al.

(10) Patent No.: US 6,926,989 B2
(45) Date of Patent: Aug. 9, 2005

(54) INTERCONNECT APPARATUS FOR FUEL CELLS

(75) Inventors: Chenggang Xie, Phoenix, AZ (US); Jay Vishal Paidipati, Streamwood, IL (US); Joseph W. Bostaph, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 426 days.

(21) Appl. No.: 10/163,030

(22) Filed: Jun. 5, 2002

(65) Prior Publication Data

US 2003/0228511 A1 Dec. 11, 2003

(51) Int. Cl.[7] .............................................. H01M 8/04
(52) U.S. Cl. .......................................... 429/39; 429/34
(58) Field of Search ............................. 429/34, 39, 54, 429/55; 137/588; 277/382, 383

(56) References Cited

U.S. PATENT DOCUMENTS

| 2,441,242 | A | * | 5/1948 | Harkins ...................... 431/154 |
| 4,188,699 | A | * | 2/1980 | Young .................... 29/890.126 |
| 5,992,702 | A | * | 11/1999 | Shapiro ...................... 222/205 |
| 6,273,478 | B1 | | 8/2001 | Benett et al. |
| 6,290,791 | B1 | | 9/2001 | Shaw et al. |
| 6,326,097 | B1 | * | 12/2001 | Hockaday ...................... 429/34 |
| 6,506,513 | B1 | * | 1/2003 | Yonetsu et al. ............... 429/34 |
| 6,585,509 | B2 | * | 7/2003 | Young et al. .................. 431/11 |
| 6,726,470 | B1 | * | 4/2004 | Meister ...................... 431/154 |
| 2001/0035351 | A1 | | 11/2001 | Simpson et al. |

FOREIGN PATENT DOCUMENTS

WO       WO 00/45172       8/2000

OTHER PUBLICATIONS

Puntambekar, A., and Ahn, Chong H., "Self–Aligning Microfluidic Interconnects with Low Dead Volume", Center for Microelectronic Sensors and MEMS, Micro Total Analysis Systems 2000.

* cited by examiner

Primary Examiner—Carol Chaney

(57) ABSTRACT

A fuel delivery system for a fuel cell (400) includes a substrate (404) having a cavity (402) formed therein, an o-ring (408) embedded within the cavity, and a detachable tube (410) inserted though and retained within the o-ring. The tube (408), when inserted through the o-ring (408), forces the o-ring to expand and fill the cavity (402) thereby forming a liquid tight seal for the transfer of liquid (414) to a fuel cell chamber (416).

1 Claim, 2 Drawing Sheets

INTERCONNECT APPARATUS FOR FUEL CELLS

FIELD OF THE INVENTION

This invention relates generally to interconnect devices and more specifically to interconnect devices used for the transfer of liquids in fuel cell assemblies.

BACKGROUND OF THE INVENTION

Current technology for supplying liquid to a ceramic or laminate fuel cell device includes using epoxy to permanently glue tubes onto the ceramic substrate. Flexible tubing is then slid over the epoxied tubes to connect the liquid source to the ceramic. The traditional epoxy approach does not allow for changing tubes and can present alignment difficulties when changing out fuel cartridges. There also exists the potential for the tubes to get filled with epoxy, thereby preventing liquid from flowing through the tubes.

Prior art microfluidic interconnect approaches have included the use of thermoplastic tubing to make a flanged self-aligned interconnect. However, the use of thermoplastics requires several processing steps including heating and melting to create a seal. Other prior art approaches include the use of a patterned ferrule having a molded ring used in conjunction with a matching patterned tube to create a seal. However, the ferrule approach requires the use of several pieces including an additional substrate.

The interconnect approaches described above, as well as other traditional approaches, have issues with chemical compatibility, sealing, assembly difficulties, permanency, and lack of interchangeable parts.

Accordingly, a need exists for a simplified apparatus that provides the ability to connect and disconnect a fuel storage cartridge to a fuel cell. A system that could overcome the disadvantages associated with traditional interconnect approaches would be a great benefit to miniature fuel cell systems.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Figure 1:
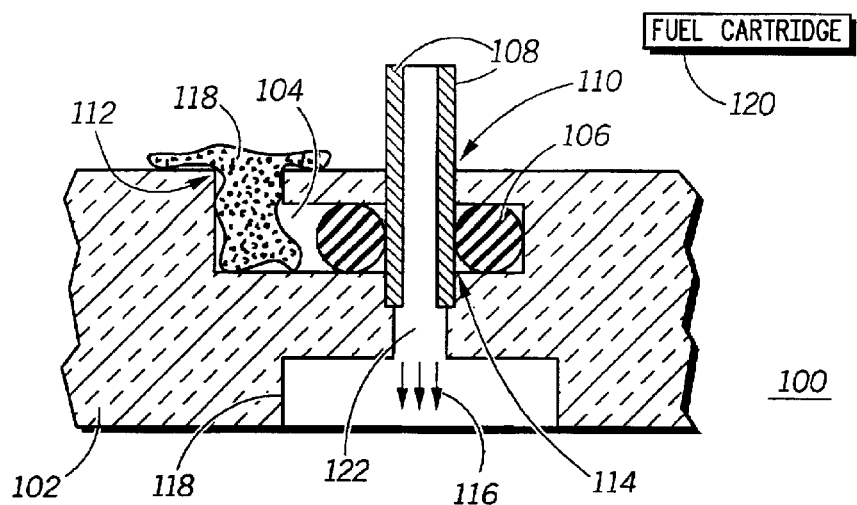
FIG. 1 illustrates, in cross section, a microfluidic interconnect apparatus in accordance with a first embodiment of the invention.

Referring now to FIG. 1 there is shown, in cross section, a microfluidic interconnect apparatus for a fuel cell in accordance with a first embodiment of the present invention. Interconnect apparatus 100 is formed as part of the fuel cell and includes a substrate 102 having a cavity 104 formed therein. In accordance with the present invention, embedded and retained within the cavity 104 is an o-ring 106. A detachable tube 108 is slideably inserted through the o-ring 106. Upon insertion of the tube 108 through the o-ring 106, the o-ring expands filling the cavity 104 and forming a liquid tight seal for the transfer of liquid 116 to a fuel cell chamber 118.

Tube 108 is preferably a substantially rigid tube formed of metal, plastic, or other suitably rigid material. Tube 108 provides for the transfer of liquid 116 to the fuel cell chamber 118. Substrate 102 is preferably a ceramic substrate or laminate substrate, and in accordance with the first embodiment, includes first and second openings 110, 112 respectively, for accessing the cavity 104. A third opening 114 is aligned below the first opening 110 to provide access to the fuel cell chamber 118. First and third openings 110, 114 are preferably formed by multi-layer low temperature co-fired ceramic technology (ML LTCC). The second opening 112, formed within substrate 102, is preferably formed using the same technique. Alternatively, the openings 104 can also be formed by drilling or etching through portions of the substrate 102. The cavity 104 is also preferably formed by multi-layer low temperature co-fired ceramic technology (ML LTCC). Alternatively, the cavity 104 can be formed by drilling or etching away an inner portion of the substrate 102 suitable in size for retaining the o-ring. The second opening 112 and cavity 104 are configured and dimensioned such that the o-ring 106 is capable of being pushed through the second opening and retained within the cavity. Once inserted into the cavity 104, the o-ring 106 is properly aligned with the first and third openings 110, 114. The first opening 110 allows insertion of the substantially rigid tube 108 through the cavity 104 and the o-ring 106 and into the third opening 114. The third opening 114 aligns with and accesses a channel 122 of the fuel cell chamber 118. The tube 108 and first and third openings 110, 114 are dimensioned to be wider than channel 122 to create a stop point for stopping tube 108 at the opening of the channel 122. The tube 108 hits the substrate 102 at the stop point at the opening of the channel 122. Thus, tube 108 accesses fuel chamber 118.

In accordance with this first embodiment, a sealant material 118, such as epoxy or other glue or adhesive, can be used to close off the second opening 112. However, experiments have shown that it is not necessary to close off the second opening 112 if the cavity 104 and o-ring sizes are selected and formed so as to create a suitable retention and fit.

Once assembled, the interconnect apparatus 100 provides a fuel delivery system for a fuel cell. The fuel delivery system can include a fuel cartridge 120 for delivering fuel 116 to the fuel cell chamber 118 The fuel cell chamber 118 receives the fuel 116 through the interconnect apparatus 100. The interconnect apparatus 100 is formed as part of the fuel cell. Again, fuel delivery system includes substrate 102 having the cavity 104 formed therein and the o-ring 106 located within the cavity. The detachable tube 108 is inserted though the o-ring 106 and cavity 104, allowing for the transfer of fluid 116 from the fuel cell cartridge 120 to the fuel cell chamber 118.

Figure 2:
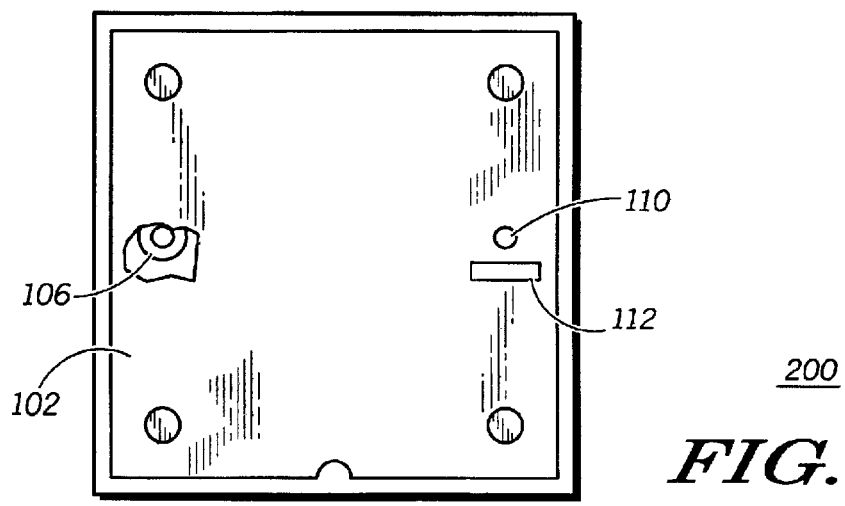
FIG. 2 shows a top plan with partial cutaway view in accordance with the first embodiment of the invention.

FIG. 2 shows a top plan with partial cutaway view of the o-ring inserted into the cavity described in FIG. 1 in accordance with the first embodiment of the invention. Like reference numerals are carried forward. Top view 200 shows the top of substrate 102 with the first and second openings 110, 112 respectively on the right hand side and a cutaway view exposing the o-ring 106 on the left hand side. The o-ring 106 is slid into second opening 112 and once fully inserted, the o-ring center aligns with the first opening 110 (and third opening 114 not seen in this view).

Figure 3:
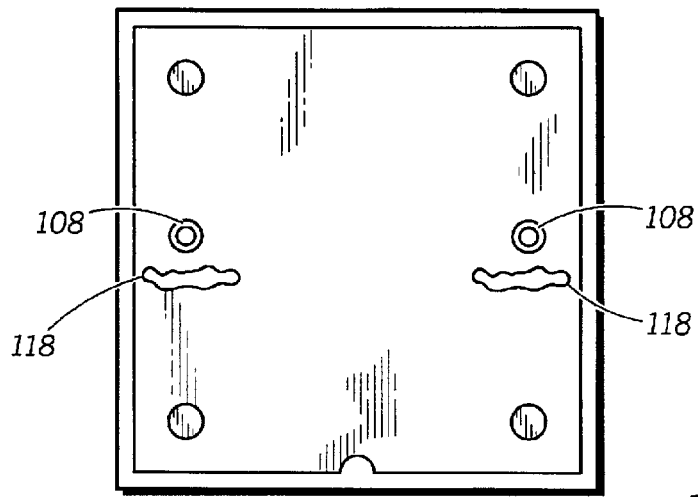
FIG. 3 shows a top plan view of the assembly of FIG. 1 in accordance with the first embodiment of the invention.

FIG. 3 shows a top plan view 300 of the tube 108 inserted into the assembly of FIG. 1 in accordance with the first embodiment of the invention. Tube 108 is inserted into first opening 110, through the o-ring 106, and third opening 114. In accordance with the first embodiment, the sealant 118 is applied to close the second opening 112. As seen in this view the sealant 118 is only used to fill the second opening 112 and not to retain the tube 108. The o-ring 106 retained within cavity 104 holds tube 108 in place. The tube 108, o-ring 106, and cavity 104 provide a liquid tight seal for the fuel cell.

Figure 4:
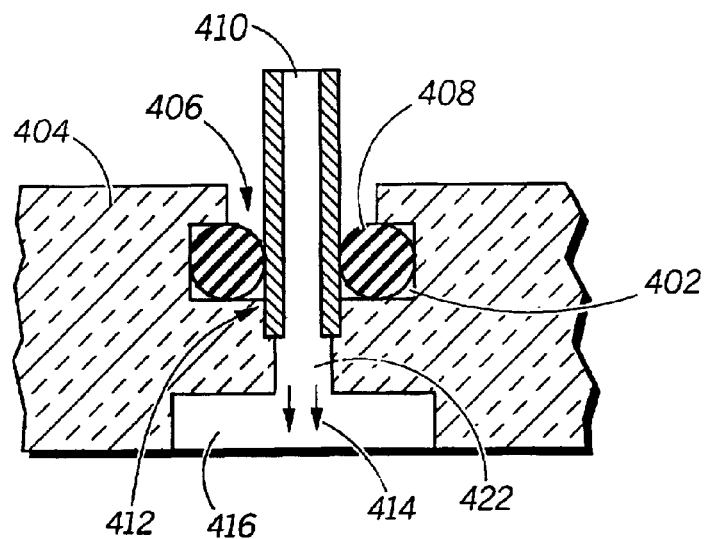
FIG. 4 shows in cross section, a microfluidic interconnect apparatus in accordance with a second embodiment of the invention.

In FIG. 4, there is shown, in cross section, a "glueless" microfluidic interconnect apparatus 400 for a fuel cell in accordance with a second embodiment of the invention. In this embodiment, a cavity 402 is formed within substrate 404 having a first opening 406 through which to embed an o-ring 408 and through which to insert a detachable tube 410. The o-ring 408 is embedded into the cavity 402 by inserting the o-ring through the first opening 406. The tube is thus inserted through the first opening 406, through the o-ring 408, and into a second opening 412. The first and second openings 406, 412 and cavity 402 are preferably formed by multi-layer low temperature co-fired ceramic technology (ML LTCC). Other techniques, such as drilling or etching, can also be used to form the openings 406, 412 and cavity 402. The first opening 406 is formed large enough to accommodate the insertion of the o-ring 408 while the second opening 412 is formed more narrowly to accommodate the tube 410. The cavity 402 is formed so as to create upper, lower, and side walls that retain the o-ring in place while allowing only for enough expansion to fill the cavity 402 once the tube 410 is inserted through the o-ring 408. The tube 410, when inserted through the o-ring 408, forces the o-ring to expand and fill the cavity 402 thereby forming a liquid tight seal for the transfer of liquid 414 to a fuel cell chamber 416. The second opening 412 aligns with and accesses a channel 422 of the fuel cell chamber 416. The tube 410 and the second opening 412 are preferably dimensioned to be wider than channel 422 so as to create a stop point for stopping tube 410 at the opening of the channel 422. Again, a liquid tight seal is formed when the tube 410 is inserted through the o-ring 408. The advantage of this second embodiment is that it is glueless and requires less cavities.

Whether the cavity is formed with one access point (as described in the second embodiment) or two access points (as described in the first embodiment) is a matter of design preference. The overall concept of embedding an o-ring into a cavity within the substrate to retain a tube provides a quick connect and disconnect mechanism in accordance with the present invention. This connect/disconnect mechanism provides a liquid tight seal that allows for improved transfer of fluids into a fuel cell. The interconnect apparatus of the present invention also provides a gas tight seal for applications involving gas, as opposed to liquid.

Figure 5:
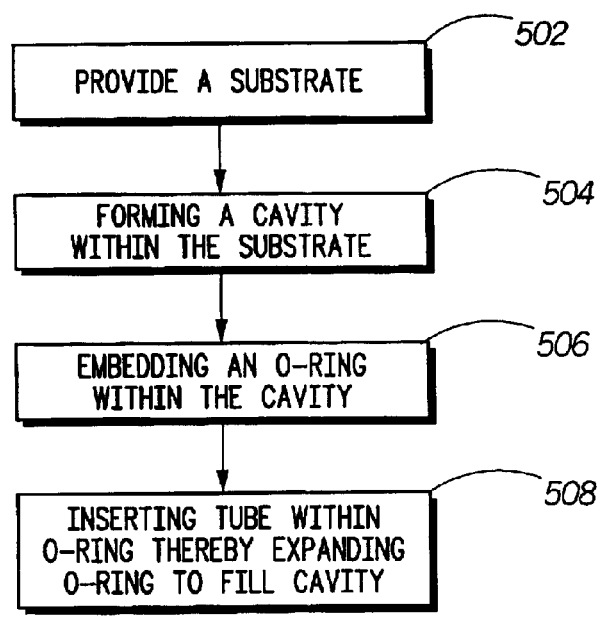
FIG. 5 shows a process of forming a liquid tight seal in a fuel cell assembly in accordance with the present invention.

FIG. 5 shows a process of forming a liquid tight seal for a fuel cell in accordance with the overall concept of the present invention. The process 500 begins at step 502 by providing a substrate, forming a cavity within the substrate at step 504, and embedding an o-ring within the cavity at step 506. Next, by inserting a substantially rigid tube within the o-ring and thereby expanding the o-ring to fill the cavity at step 508, a liquid tight seal in the fuel cell is formed.

Accordingly, there has been provided a fuel cell assembly that provides a liquid tight seal. The embedding of an o-ring within a cavity formed within the substrate provides a quick connect and disconnect mechanism for an insertable tube to access a fuel cell. Various sizes of tubes, o-rings, and cavity formation can be used to form the desired liquid tight seal. A significant advantage of the interconnect structure of the present invention is the ability to connect and disconnect the tubing, each time making a liquid tight seal. The interconnect apparatus of the present invention also provides a more efficient fuel cell assembly in that faulty assembly is minimized, fewer parts are used, possible contamination issues are minimized and the tube is far less apt to inadvertently get filled with epoxy. These advantages are of great benefit to miniature fuel cell systems.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus teat comprises a list of elements does not include only those elements but may include other elements not expressly listed or inherent to such process, method, article, or apparatus.

We claim:

1. A delivery system for delivering a liquid or a gas, comprising:
   a device for transporting the liquid or gas therethrough;
   an o-ring;
   a substrate defining
      a surface having a first portion and a second portion;
      a chamber;
      a first channel with a first opening in the first portion of the surface for receiving the device, and a second opening leading to the chamber, and
      a second channel with a third opening in the second portion of the surface and spaced apart from the first opening for receiving and passing the o-ring through the second channel to a cavity formed around the first channel;
   wherein the o-ring has a dimension larger than the first channel so that the o-ring will not pass through the first channel and wherein the o-ring, having the device contactually inserted therethrough, will prevent the liquid or gas from passing from the chamber to either of the first opening, other than through the device, and the third opening.

* * * * *